(12) United States Patent
Matsubara et al.

(10) Patent No.: US 8,955,985 B2
(45) Date of Patent: Feb. 17, 2015

(54) LIGHTING DEVICE AND PROJECTION-TYPE DISPLAY DEVICE USING SAME

(75) Inventors: Masateru Matsubara, Tokyo (JP); Hiroyuki Saitou, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 123 days.

(21) Appl. No.: 13/878,500

(22) PCT Filed: Oct. 19, 2010

(86) PCT No.: PCT/JP2010/068370
§ 371 (c)(1),
(2), (4) Date: Apr. 9, 2013

(87) PCT Pub. No.: WO2012/053057
PCT Pub. Date: Apr. 26, 2012

(65) Prior Publication Data
US 2013/0194552 A1    Aug. 1, 2013

(51) Int. Cl.
*G03B 21/20* (2006.01)
*H04N 9/31* (2006.01)
(Continued)

(52) U.S. Cl.
CPC ............ *F21V 13/14* (2013.01); *G03B 21/2033* (2013.01); *G03B 21/2066* (2013.01);
(Continued)

(58) Field of Classification Search
CPC .. G03B 21/20; G03B 21/2033; G03B 21/204; G03B 21/2066; G03B 21/2093; G03B 21/14; G03B 33/06; G03B 33/12; H04N 9/31; H04N 9/3111; H04N 9/3114; H04N 9/3117; H04N 9/3161; H04N 9/3164; H04N 9/3158

USPC ................. 353/30–31, 33, 37, 81, 84–85, 94, 353/98–99, 885, 887, 889–892, 102; 362/84, 217.08, 230–231, 235–236, 362/260, 293
See application file for complete search history.

(56) References Cited

U.S. PATENT DOCUMENTS 8,167,440 B2 * 5/2012 Sato et al. ........................ 353/99
8,231,227 B2 * 7/2012 Kurosaki ......................... 353/31
(Continued)

FOREIGN PATENT DOCUMENTS

JP    2003-186110 A    7/2003
JP    2009-259583 A    11/2009
(Continued)

OTHER PUBLICATIONS

International Search Report in PCT/JP2010/068370 dated Nov. 16, 2010 (English Translation Thereof).

*Primary Examiner* — Tony Ko
*Assistant Examiner* — Jori S Reilly-Diakun
(74) *Attorney, Agent, or Firm* — McGinn IP Law Group, PLLC

(57) ABSTRACT

A lighting device includes excitation light sources, phosphor wheel that emits green fluorescent light, a collimator lens that converts the emitted fluorescent light into parallel luminous flux, a red laser, a blue laser, a dichroic mirror that combines the excitation light supplied from the excitation light sources and the light supplied from the red laser, and a cross dichroic prism that combines the fluorescent light emitted from phosphor wheel, the light supplied from the red laser and the light supplied from the blue laser. The cross dichroic prism supplies the excitation light supplied from the excitation light sources to the collimator lens and the collimator lens condenses the incident excitation light on the phosphor wheel.

9 Claims, 5 Drawing Sheets

(51) Int. Cl.
  *F21V 13/14* (2006.01)
  *G03B 33/06* (2006.01)
  *G03B 33/12* (2006.01)
  *G03B 21/14* (2006.01)

(52) U.S. Cl.
  CPC .......... H04N9/3161 (2013.01); G03B 21/2013 (2013.01); G03B 21/204 (2013.01); H04N 9/3164 (2013.01); H04N 9/3158 (2013.01); *G03B 33/06* (2013.01); *G03B 33/12* (2013.01); *G03B 21/14* (2013.01)
  USPC .................. 353/84; 353/33; 353/94; 362/84; 362/231

(56) References Cited

U.S. PATENT DOCUMENTS

| | | | |
|---|---|---|---|
| 8,308,306 B2* | 11/2012 | Miyazaki et al. | 353/84 |
| 8,337,027 B2* | 12/2012 | Ogura et al. | 353/85 |
| 8,342,697 B2* | 1/2013 | Iwanaga | 353/94 |
| 8,348,432 B2* | 1/2013 | Miyazaki | 353/31 |
| 8,393,741 B2* | 3/2013 | Fukano | 353/85 |
| 8,434,875 B2* | 5/2013 | Masuda | 353/85 |
| 8,616,710 B2* | 12/2013 | Fukano | 353/85 |
| 8,662,673 B2* | 3/2014 | Miyazaki | 353/31 |
| 2003/0133080 A1 | 7/2003 | Ogawa et al. | |
| 2009/0262308 A1 | 10/2009 | Ogawa | |
| 2009/0268167 A1 | 10/2009 | Narikawa | |
| 2010/0079730 A1* | 4/2010 | Shibasaki | 353/31 |
| 2010/0245777 A1* | 9/2010 | Ogura | 353/38 |
| 2010/0328554 A1* | 12/2010 | Shibasaki | 348/760 |
| 2010/0328628 A1* | 12/2010 | Masuda | 353/85 |
| 2010/0328632 A1* | 12/2010 | Kurosaki et al. | 353/98 |
| 2010/0328633 A1* | 12/2010 | Sato et al. | 353/99 |
| 2011/0043765 A1* | 2/2011 | Shibasaki | 353/31 |
| 2011/0051102 A1* | 3/2011 | Ogura et al. | 353/85 |
| 2011/0063581 A1* | 3/2011 | Iwanaga | 353/31 |
| 2011/0075103 A1* | 3/2011 | Ogawa et al. | 353/31 |
| 2011/0075106 A1* | 3/2011 | Shibasaki | 353/31 |
| 2011/0096297 A1* | 4/2011 | Ogino et al. | 353/31 |
| 2011/0292349 A1* | 12/2011 | Kitano et al. | 353/31 |
| 2011/0304831 A1* | 12/2011 | Yoshigai | 353/85 |
| 2012/0019786 A1* | 1/2012 | Kimura | 353/31 |
| 2012/0026472 A1* | 2/2012 | Masuda | 353/85 |
| 2012/0050691 A1* | 3/2012 | Tsuda et al. | 353/31 |
| 2012/0127435 A1* | 5/2012 | Kitano et al. | 353/20 |
| 2012/0140185 A1* | 6/2012 | Masuda | 353/31 |
| 2012/0147331 A1* | 6/2012 | Miyazaki | 353/31 |
| 2012/0262677 A1* | 10/2012 | Ogino et al. | 353/31 |
| 2012/0268917 A1* | 10/2012 | Kitano et al. | 362/84 |
| 2013/0002972 A1* | 1/2013 | Tanaka | 349/8 |
| 2013/0021582 A1* | 1/2013 | Fujita et al. | 353/31 |
| 2013/0033682 A1* | 2/2013 | Hsu et al. | 353/33 |
| 2013/0033683 A1* | 2/2013 | Hsu et al. | 353/33 |
| 2013/0044296 A1* | 2/2013 | Hsu et al. | 353/33 |
| 2013/0100421 A1* | 4/2013 | Hsu et al. | 353/33 |
| 2013/0107222 A1* | 5/2013 | Hsu et al. | 353/31 |
| 2013/0114044 A1* | 5/2013 | Inoue et al. | 353/31 |
| 2013/0215397 A1* | 8/2013 | Matsubara | 353/57 |
| 2013/0222772 A1* | 8/2013 | Matsubara | 353/31 |
| 2013/0242266 A1* | 9/2013 | Hara | 353/31 |
| 2013/0250255 A1* | 9/2013 | Kurosaki et al. | 353/85 |
| 2013/0322056 A1* | 12/2013 | Konuma et al. | 362/84 |
| 2014/0043589 A1* | 2/2014 | Chifu et al. | 353/33 |
| 2014/0125956 A1* | 5/2014 | Chifu et al. | 353/31 |

FOREIGN PATENT DOCUMENTS

| | | |
|---|---|---|
| JP | 2009-266619 A | 11/2009 |
| JP | 2010-197497 A | 9/2010 |

* cited by examiner

LIGHTING DEVICE AND PROJECTION-TYPE DISPLAY DEVICE USING SAME

TECHNICAL FIELD

The present invention relates to the lighting device of a projection-type display device.

BACKGROUND ART

Patent Document 1 describes a projector that uses a phosphor as a light source.

The projector described in Patent Document 1 has a light source device that includes a light-emitting device in which the fluorescent color is red, a light-emitting device in which the fluorescent color is green, a light-emitting device in which the fluorescent color is blue, and first and second dichroic minors that combine the fluorescent light of each color from these light-emitting devices.

Each light-emitting device includes a cylinder-shaped rotating body in which a phosphor layer is formed on the outer periphery, a drive source that rotates the rotating body, a collimator lens that converts the fluorescent luminous flux emitted from the phosphor layer to parallel luminous flux, an excitation light source, and a mirror that reflects excitation light from the excitation light source in the direction toward the phosphor layer. The excitation light that is reflected by the mirror is irradiated by way of the collimator lens onto the phosphor layer. The fluorescent light that is emitted from the phosphor layer is converted to parallel luminous flux by the collimator lens.

The blue fluorescent light that is emitted from the blue light-emitting device is entered to one surface of the first dichroic minor and the green fluorescent light that is emitted from the green light-emitting device is entered to the other surface of the first dichroic minor. The first dichroic minor has the property of transmitting blue light but reflecting green light and thus combines the incident blue and green fluorescent light.

The fluorescent light (green and blue) that is combined in the first dichroic mirror is entered to one surface of the second dichroic mirror, and red fluorescent light that is emitted from the red light-emitting device is entered to the other surface of the second dichroic mirror. The second dichroic minor has the property of transmitting blue and green light but reflecting red light and thus combines the incident blue, green, and red fluorescent light.

In the above-described projector, light from the light source device is irradiated to a display element, and the image formed in this display element is then projected onto a screen by projection-side optics.

In addition to the above-described projector, Patent Document 2 describes a projector that uses light-emitting diodes (LED) as a light source.

The projector described in Patent Document 2 has illumination optics that includes: a red LED array in which a plurality of red LEDs are arranged, a green LED array in which a plurality of green LEDs are arranged, a blue LED array in which a plurality of blue LEDs are arranged, and a cross dichroic prism that combines the luminous flux for each of the colors red, green, and blue from these LED arrays.

In the above-described projector, light from the illumination optics is irradiated into a digital micro-device (DMD) and the image formed by the DMD is projected onto a screen by projection lenses.

LITERATURE OF THE PRIOR ART

Patent Documents

Patent Document 1: Japanese Unexamined Patent Application Publication No. 2010-197497
Patent Document 2: Japanese Unexamined Patent Application Publication No. 2003-186110

SUMMARY OF THE INVENTION

The recent advances in the development of compact high-luminance projectors have created demand for lighting devices (the light source device described in Patent Document 1 and the illumination optics described in Patent Document 2) that are more compact and that have greater luminance so that such projectors can be realized.

In the projector described in Patent Document 1, a high-luminance light-emitting device can be provided through the use of fluorescent light as the light source, but this type of light-emitting device is larger than a solid-state light source such as a semiconductor laser or LED, and a light source device having greater compactness is therefore difficult to achieve.

On the other hand, in the projector described in Patent Document 2, since LEDs are used as the light source, it is easier to realize illumination optics (lighting device) having greater compactness compared to the device described in Patent Document 1. However, the projector described in Patent Document 2suffers from the problems described below.

High-luminance components in the form of green lasers or green LEDs are not yet being mass-produced and, currently, low-luminance components are being used. As a result, LEDs in the projector described in Patent Document 2 achieve high luminance by being arranged in an array.

However, a projection-type display device in which light from the light source is irradiated upon a display element and the image formed in the display element is projected by projection lens is subject to the constraint known as "etendue" that is determined by the area of the light source and the angle of divergence. If the value of the product of the area of the light source and the angle of divergence is not made equal to or less than the value of the product of the area of the display element and the acceptance angle (solid angle) that is determined by the f-number of the projection lens, the light from the light source cannot be used as projection light. Accordingly, even if a multiplicity of LEDs is aligned in an array, brightness cannot be improved beyond the limits of etendue.

In the illumination optics described in Patent Document 2, since the area of the LED semiconductor chip or the number of LEDs is limited due to the above-described limits of etendue, it is difficult to obtain output light whose amount is enough. Thus realizing higher luminance in the illumination optics described in Patent Document 2 is difficult.

It is an object of the present invention to provide a lighting device that features both compactness and high luminance and a projection-type display device that is equipped with this lighting device.

In order to achieve the above-described object, the lighting device of the present invention includes:
an excitation light source unit that supplies excitation light;
a phosphor unit that emits fluorescent light by excitation caused by excitation light supplied from the excitation light source unit;
a collimator lens that converts the fluorescent light emitted from the phosphor unit to parallel luminous flux;

a first solid-state light source that supplies first light whose peak wavelength is set in a first wavelength band in which wavelength is longer than the wavelength of the fluorescent light emitted from the phosphor unit;

a second solid-state light source that supplies second light whose peak wavelength is set in a second wavelength band that differs from the first wavelength band;

a dichroic mirror in which the excitation light supplied from the excitation light source unit and light supplied from the first solid-state light source are combined and exited as a combined light; and color-combining means that is provided with first to fourth surfaces, light that was combined by the dichroic mirror being supplied to the first surface, and form the combined light supplied to the first surface, the excitation light being exited toward the phosphor unit from the second surface, the first light being exited from the fourth surface, the fluorescent light emitted from the phosphor unit being supplied to the second surface, the fluorescent light that was supplied to the second surface being exited from the fourth surface, the second light that was supplied from the second solid-state light source being supplied to the third surface, and the second light that was supplied to the third surface being exited from the fourth surface;

wherein the collimator lens condenses the excitation light that was exited from the second surface of the color-combining means on the phosphor unit.

The projection-type display device of the present invention includes:

the above-described lighting device;

a display element that spatially modulates light that is exited from the lighting device; and projection optics that project image light that was formed by the display element.

Figure 1:
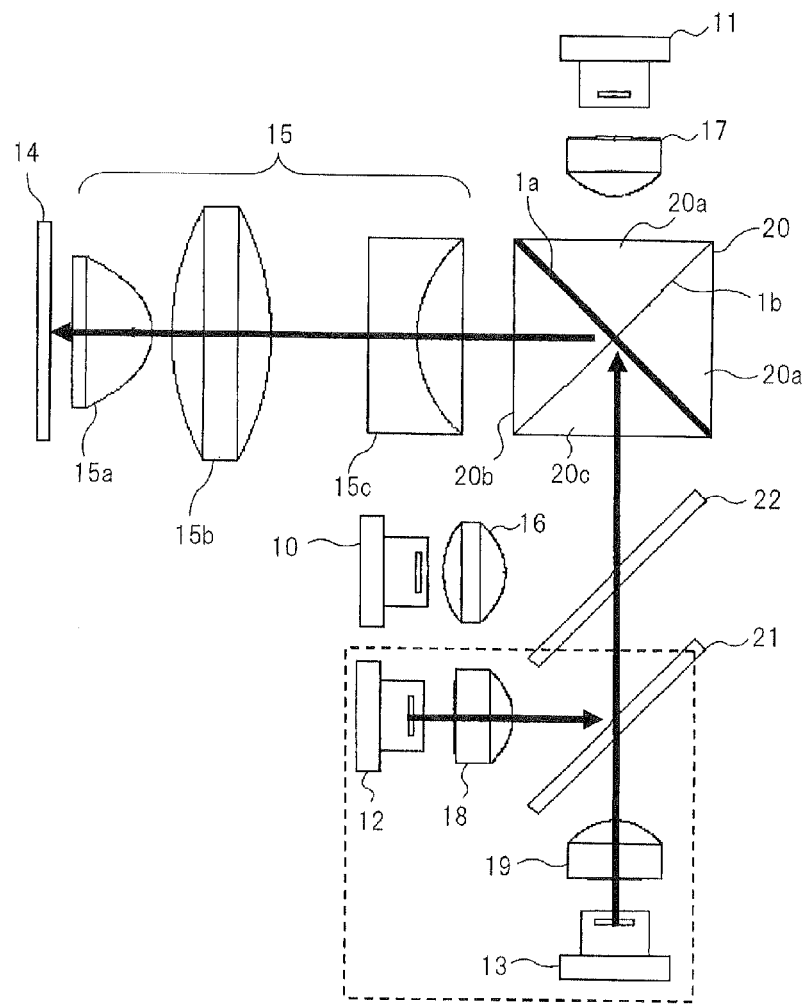
FIG. 1 is a schematic view showing the configuration of the lighting device that is an exemplary embodiment of the present invention.

EXPLANATION OF REFERENCE NUMBERS 10 red laser
11 blue laser
12, 13 excitation light sources
14 phosphor wheel
15-19 collimator lens
20 cross dichroic prism
21 mirror
22 dichroic mirror

BEST MODE FOR CARRYING OUT THE INVENTION

An exemplary embodiment of the present invention is next described with reference to the accompanying drawings.

FIG. 1 is a schematic view showing the configuration of the lighting device that is an exemplary embodiment of the present invention.

Referring to FIG. 1, the lighting device is used in a projection-type display device such as a projector and includes: red laser 10, blue laser 11, excitation light sources 12 and 13, phosphor wheel 14, collimator lenses 15-19, cross dichroic prism 20, mirror 21, and dichroic mirror 22.

For the sake of convenience, in FIG. 1, only the optical paths of excitation light that is supplied from excitation light sources 12 and 13 are shown, and the optical path of red laser light that is supplied from red laser 10, the optical path of blue laser light that is supplied from blue laser 11, and the optical path of green fluorescent light that is emitted from phosphor wheel 14 are not shown. In addition, although the optical paths of excitation light shown in FIG. 1 show only the optical paths of the center beams, the excitation light is actually made up of a bundle of rays composed of a plurality of optical rays.

Red laser 10 and blue laser 11 are solid-state light sources such as semiconductor lasers or LEDs of which laser diodes are representative. Red laser 10 supplies S-polarized laser light having a peak wavelength in the red wavelength band (hereinbelow indicated as red laser light). Blue laser 11 supplies S-polarized laser light having a peak wavelength in the blue wavelength band (hereinbelow indicated as blue laser light).

Phosphor wheel 14 is composed of a wheel on which a phosphor region is formed along the outer periphery of one surface. The center portion of phosphor wheel 14 is supported by a rotation axis that is linked to an output axis of a motor not shown in the figure (or the output axis), phosphor wheel 14 receiving the rotational drive realized by the motor and rotating at a fixed speed. The emitted color of the phosphor that is formed in the phosphor region is green, and due to the excitation of the phosphor by the excitation light of a wavelength shorter than that of this green wavelength, green phosphor light is emitted from the phosphor region.

Excitation light sources 12 and 13 are light sources that supply S-polarized excitation light of a wavelength that is shorter than the wavelength of green fluorescent light, and are made up of solid-state light sources of which, for example, blue lasers or blue LEDs are representative. The peak wavelength of output light of excitation light sources 12 and 13 may be the same as or may differ from blue laser 11.

Collimator lens 15 is a component that converts the green fluorescent light (diverging light) that is emitted from the phosphor region of phosphor wheel 14 to parallel luminous flux and is made up of two convex lenses 15a and 15b and one concave lens 15c. Collimator lens 15 is not limited to the lens configuration shown in FIG. 1, and may be of any lens configuration that enables conversion of the green fluorescent light emitted from the phosphor region to parallel luminous flux.

Collimator lens 16 converts the red laser light (diverging light) supplied from red laser 10 to parallel luminous flux. Collimator lens 17 converts the blue laser light (diverging light) that is supplied from blue laser 11 to parallel luminous flux. Collimator lens 18 converts the excitation light (diverging light) that is supplied from excitation light source 12 to parallel luminous flux. Collimator lens 19 converts the excitation light (diverging light) that is supplied from excitation light source 13 to parallel luminous flux.

Excitation light sources 12 and 13 are arranged such that their optical axes cross in a state separated by a predetermined distance and without intersecting within the same plane (more preferably, a first plane that contains one optical axis and a second plane that contains the other optical axis are parallel, and both optical axes are orthogonal when seen from a direction that is perpendicular to the first and second planes), and mirror 21 is provided at the position at which the optical axes of these excitation light sources 12 and 13 intersect.

Figure 2:
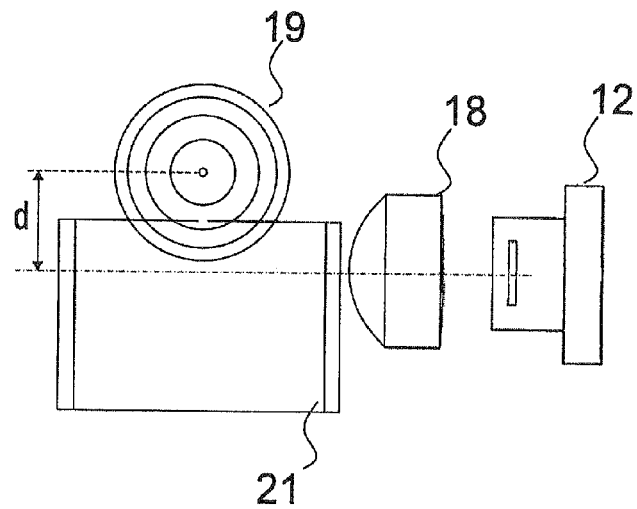
FIG. 2 is a schematic view showing the configuration of the excitation light source unit of the lighting device shown in FIG. 1.

FIG. 2 is a schematic view of the excitation light source portion that is enclosed by broken lines in FIG. 1 (excitation light sources 12 and 13, collimator lenses 18 and 19, and mirror 21) when viewed from the direction of the optical axis of excitation light source 13.

As shown in FIG. 2, excitation light that is supplied from excitation light source 12 and converted to parallel luminous flux by collimator lens 18 is supplied to mirror 21. On the other hand, excitation light that is supplied from excitation light source 13 and converted to parallel luminous flux by collimator lens 19 passes through space around mirror 21. These optical axes are separated by distance d at the position at which the optical axis of excitation light source 12 and the optical axis of excitation light source 13 cross.

Distance d is set such that excitation light that is supplied from excitation light source 13 and converted to luminous flux by collimator lens 19 is supplied to dichroic mirror 22 without being blocked by mirror 21.

The optical axis of red laser 10 is parallel with the optical axis of excitation light source 12. Dichroic mirror 22 is provided at the position at which the optical axis of red laser 10 crosses the optical axis of excitation light source 13 (identical to the position at which the center light ray of red laser light crosses the center light ray of excitation light from excitation light source 12). At the position at which the optical axis of red laser 10 crosses the optical axis of excitation light source 13, the optical axis of red laser is separated by a distance d/2 from each of the optical axis of excitation light source 12 and the optical axis of excitation light source 13. In other words, the optical axis of red laser 10 is located midway between the optical axis of excitation light source 12 and the optical axis of excitation light source 13.

The red laser light that is supplied from red laser 10 and converted to parallel luminous flux by collimator lens 16 is entered to one surface of dichroic mirror 22. The angle of incidence of the red laser light to one surface of dichroic mirror 22 is approximately 45°.

On the other hand, the reflected light of the excitation light from mirror 21 is entered to the other surface of dichroic mirror 22. Excitation light that is supplied from excitation light source 13 and converted to parallel luminous flux by collimator lens 19 is also entered to the other surface of dichroic mirror 22, but the position of incidence differs from the position of incidence of the reflected light of the excitation light from mirror 21. The angle of incidence of these two beams of excitation light to the other surface of dichroic mirror 22 is approximately 45°.

The red laser light from red laser 10 is reflected on one surface of dichroic mirror 22 and this reflected light advances toward cross dichroic prism 20. Both the reflected light of the excitation light from mirror 21 and the excitation light from excitation light source 13 are transmitted through dichroic mirror 22, and this transmitted excitation light advances toward cross dichroic prism 20.

Cross dichroic prism 20 is made up of four rectangular prisms 20a-20d in which surfaces that form right angles are bonded together.

A uniform first plane is formed by the bonded surfaces of rectangular prisms 20a and 20b and the bonded surfaces of rectangular prisms 20c and 20d, and first dichroic surface (film) 1a composed of a dielectric multilayer film is formed on this first plane.

A uniform second plane is formed by the bonded surfaces of rectangular prisms 20a and 20d and the bonded surfaces of rectangular prisms 20b and 20c, and second dichroic surface (film) 1b composed of dielectric multilayer film is formed on this second plane.

First dichroic surface 1a and second dichroic surface 1b are arranged such that the film surfaces intersect with each other (preferably orthogonally). First dichroic surface 1a transmits red laser light and reflects blue laser light and excitation light. Second dichroic surface 1b reflects red laser light and transmits blue laser light and excitation light.

Figure 3:
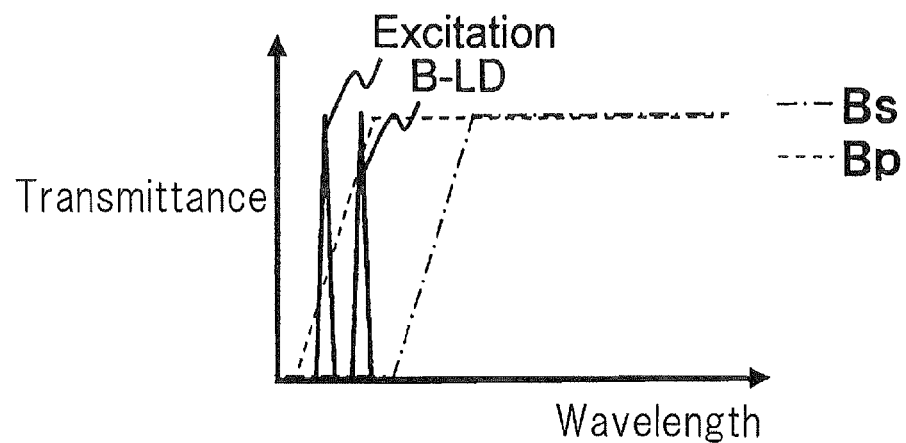
FIG. 3 is a graph showing the spectral transmission characteristics for P-polarized light and S-polarized light of the first dichroic surface (film) of the lighting device shown in FIG. 1.

FIG. 3 is a graph showing the spectral transmission characteristics with respect to P-polarized light and S-polarized light of first dichroic surface 1a. In FIG. 3, the alternate long and short dash line shows the spectral transmission characteristics with respect to S-polarized light, and the broken line shows the spectral transmission characteristics with respect to P-polarized light. B-LD is the spectrum of blue laser light that is supplied from blue laser 11, and the spectrum (Excitation) that is further toward the low-wavelength side is the spectrum of excitation light that is supplied from excitation light sources 12 and 13. The spectrum of blue laser light may be the same wavelength band as the spectrum of excitation light.

The cutoff wavelength is defined as the wavelength at which transmittance becomes 50%. The cutoff wavelength of first dichroic surface 1a with respect to light that is entered as S-polarized light is set such that light of a shorter wavelength band than blue light is reflected and light of other wavelength bands (including the wavelength bands of green and red) is transmitted. The cutoff wavelength of first dichroic surface 1a with respect to light that is entered as P-polarized light is set to the shorter wavelength side from the cutoff wavelength with respect to S-polarized light. The setting of the cutoff wavelength can be adjusted by the material, the number of layers, the film thickness, and the refractive index of the dielectric multilayer film.

In first dichroic surface 1a that has the spectral transmission characteristics shown in FIG. 3, S-polarized light of a wavelength band that is lower than that of blue light is reflected and S-polarized light of the wavelength bands of green and red is transmitted.

Figure 4:
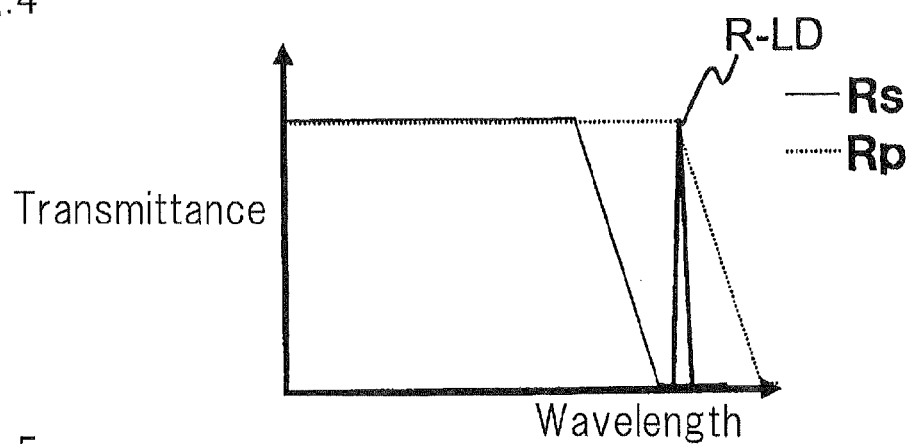
FIG. 4 is a graph showing the spectral transmission characteristics for P-polarized light and S-polarized light of the second dichroic surface (film) of the lighting device shown in FIG. 1.

FIG. 4 is a graph showing the spectral transmission characteristics with respect to P-polarized light and S-polarized light of second dichroic surface 1b. In FIG. 4, the solid lines indicate the spectral transmission characteristic with respect to S-polarized light, and the dotted lines show the spectral transmission characteristic with respect to P-polarized light. R-LD is the spectrum of red laser light supplied from red laser 10.

The cutoff wavelength of second dichroic surface 1b with respect to light that is entered as S-polarized light is set such that light of a wavelength band greater than red is reflected and light of other wavelength bands (including the wavelength bands of green and blue) is transmitted. The cutoff wavelength of second dichroic surface 1b with respect to light that is entered as P-polarized light is set toward the side of longer wavelengths than the cutoff wavelength with respect to S-polarized light. In this case as well, the setting of the cutoff wavelength can be adjusted by means of the material, number of layers, film thickness, and refractive index of the dielectric multilayer film.

In second dichroic surface 1b having the spectral transmission characteristics shown in FIG. 4, S-polarized light of a wavelength band greater than red is reflected and S-polarized light of the wavelength bands of green and blue is transmitted.

Red laser light from red laser 10 and excitation light from excitation light sources 12 and 13 are entered to cross dichroic prism 20 from, of the four side surfaces of cross dichroic prism 20, the side surface constituted by rectangular prism 20c. On the other hand, blue laser light from blue laser 11 is entered to cross dichroic prism 20 from, of the four side surfaces, the side surface made up from rectangular prism 20a (the side surface that is opposite the side surface that is made up of rectangular prism 20c).

In cross dichroic prism 20, excitation light from excitation light sources 12 and 13 is reflected by first dichroic surface 1a. The reflected light of the excitation light that was reflected by first dichroic surface 1a is exited from, of the above-described four side surfaces, the side surface that is constituted by rectangular prism 20b.

In cross dichroic prism 20, moreover, red laser light from red laser 10 is reflected by second dichroic surface 1b. The direction of advance of this reflected light is the direction opposite the direction of advance of the excitation light that was reflected by first dichroic surface 1a. The reflected red laser light that was reflected by second dichroic surface 1b is exited from, of the above-described four side surfaces, the side surface that is constituted by rectangular prism 20d (the side surface that is opposite the side surface that is constituted by rectangular prism 20b).

In addition, in cross dichroic prism 20, blue laser light from blue laser 11 is reflected by first dichroic surface 1a. The direction of advance of this reflected light is the same as the direction of advance of the red laser light that is reflected by second dichroic surface 1b. The reflected light of the blue laser light that was reflected by first dichroic surface 1a is exited from the side surface that is constituted by rectangular prism 20d.

The excitation light that is exited from the side surface constituted by rectangular prism 20b passes by way of collimator lens 15 and is condensed in the phosphor region of phosphor wheel 14. In the phosphor region, the phosphor material is irradiated by the excitation light. Green fluorescent light is emitted from the excited phosphor material.

Figure 5:
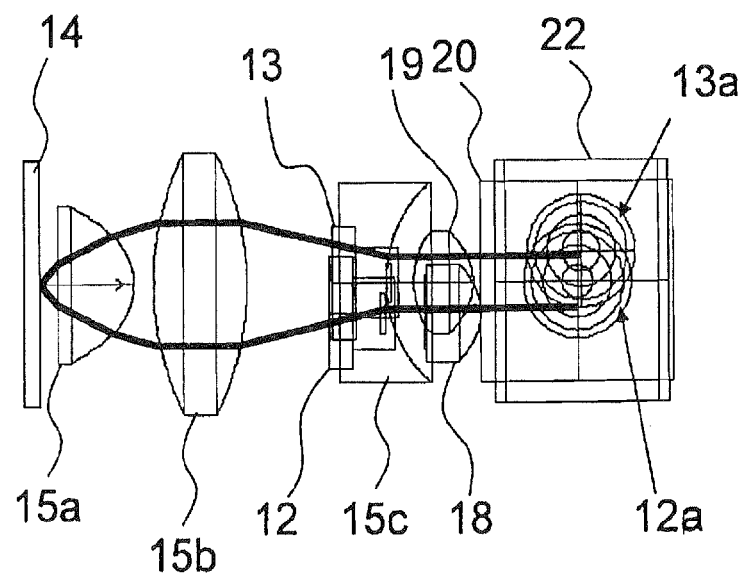
FIG. 5 is a schematic view showing the optical path of excitation light when viewed from the side surface of a portion of the lighting device shown in FIG. 1.

FIG. 5 is a schematic view of the optical paths of the excitation light from excitation light sources 12 and 13 when the lighting device is viewed from the side surface that is constituted by, of the four side surfaces of cross dichroic prism 20, rectangular prism 20a. For the sake of convenience, red laser 10, blue laser 11, collimator lens 16, and mirror 21 are omitted.

In FIG. 5, of the optical paths shown by heavy lines (solid lines), the optical path on the upper side of the figure is the optical path of the center ray of excitation light 13a from excitation light source 13, and the optical path on the lower side is the center ray of excitation light 12a from excitation light source 12. Although the optical paths of the center rays of excitation light 12a and 13a are shown in FIG. 5, excitation light 12a and 13a is actually luminous flux.

As shown in FIG. 5, excitation light 12a and 13a from excitation light sources 12 and 13 that is reflected by first dichroic surface 1a is condensed on the phosphor region of phosphor wheel 14 by collimator lens 15 that is composed of three lenses 15a-15c.

The center ray of excitation light 12a from first dichroic surface 1a and the center ray of excitation light 13a from first dichroic surface 1a are in a positional relation that is substantially linearly symmetrical around the optical axis of collimator lens 15. As a result, the center ray of excitation light 12a and the center ray of excitation light 13a are condensed by collimator lens 15 at one point on the phosphor region, and the spot of luminous flux of excitation light on the phosphor region 12a therefore exactly coincides with the spot of luminous flux of excitation light 13a.

The green fluorescent light (diverging light) that is emitted from the phosphor region of phosphor wheel 14, after being converted to parallel luminous flux by collimator lens 15, is entered into cross dichroic prism 20 from, of the four side surfaces of cross dichroic prism 20, the side surface that is constituted by rectangular prism 20b.

Figure 6:
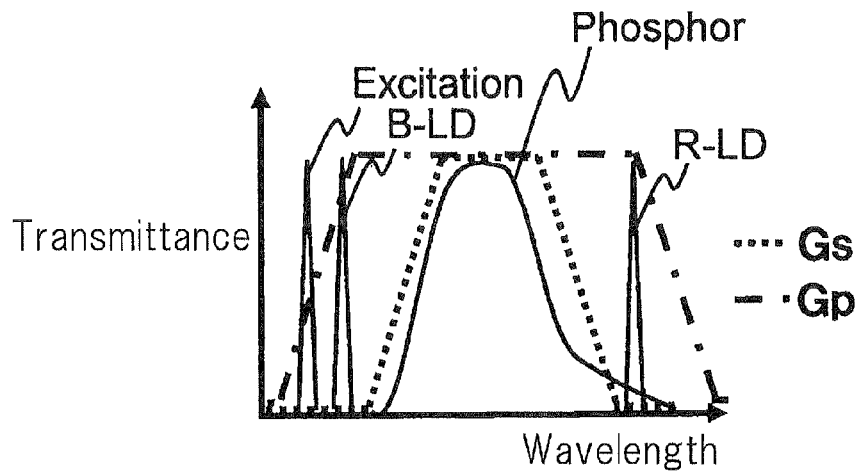
FIG. 6 is a graph showing the transmittance characteristic of the second dichroic surface shown in FIG. 4 superposed on the transmittance characteristic of the first dichroic surface shown in FIG. 3.

FIG. 6 shows the transmittance characteristic of second dichroic surface 1b superposed on the transmittance characteristic of first dichroic surface 1a. In FIG. 6, the dotted lines show the spectral transmission characteristic with respect to S-polarized light, and the alternate long and short dash lines show the spectral transmission characteristic with respect to P-polarized light. The curve indicated by the solid line in the central portion in FIG. 6 is the spectrum of green fluorescent light from phosphor wheel 14.

The green fluorescent light from phosphor wheel 14 is random polarized light (containing both S-polarized light and P-polarized light), and virtually all of this light is transmitted by first dichroic surface 1a and second dichroic surface 1b. The transmitted luminous flux of the green fluorescent light is exited from, of the above-described four side surfaces, the side surface constituted by rectangular prism 20d.

The operation of the lighting device of the present exemplary embodiment is next described.

As shown in FIG. 1, the excitation light from excitation light sources 12 and 13 is entered into cross dichroic prism 20 from the side surface that is constituted by rectangular prism 20c of cross dichroic prism 20.

In cross dichroic prism 20, excitation light is reflected by first dichroic surface 1a, and the reflected light of this excitation light is condensed on the phosphor region of phosphor wheel 14 by collimator lens 15.

On phosphor wheel 14, phosphor material is excited in the region that is irradiated by the excitation light and green fluorescent light is emitted from this phosphor material.

Figure 7:
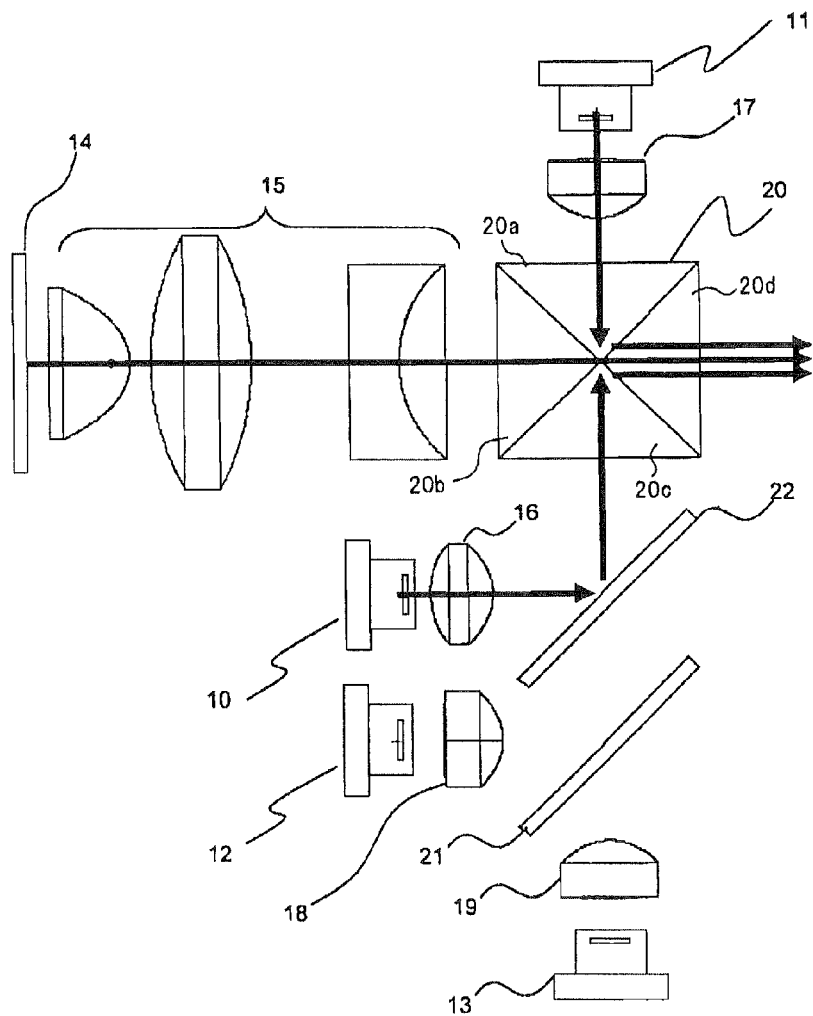
FIG. 7 is a schematic view showing the optical paths of green fluorescent light, red laser light, and blue laser light in the lighting device shown in FIG. 1.

As shown in FIG. 7, the green fluorescent light from phosphor wheel 14 is converted to parallel luminous flux by collimator lens 15, and this parallel luminous flux is entered into cross dichroic prism 20 from the side surface that is constituted by rectangular prism 20b.

The red laser light from red laser 10 is converted to parallel luminous flux by collimator lens 16, and this parallel luminous flux is entered into cross dichroic prism 20 from the side surface constituted by rectangular prism 20c.

The blue laser light from blue laser 11 is converted to parallel luminous flux by collimator lens 17, and this parallel luminous flux is entered into cross dichroic prism 20 from the side surface constituted by rectangular prism 20a.

In cross dichroic prism 20, first dichroic surface 1a transmits the red laser light and green fluorescent light and reflects the blue laser light, and second dichroic surface 1b transmits the blue laser light and green fluorescent light and reflects the red laser light. In other words, in cross dichroic prism 20, the red and blue laser light and green fluorescent light are combined, and this combined light (red, blue and green) is exited from the side surface constituted by rectangular prism 20d.

The lighting device of the present exemplary embodiment as described hereinabove exhibits the following action and effect.

The light-emitting device described in Patent Document 1 suffers from the problem of the large size of the light-emitting devices due to the use of light sources (light-emitting devices) that uses phosphor material as the red, green and blue light sources. In contrast, in the lighting device of the present exemplary embodiment, red and blue light sources are made of solid-state light sources, and the green light source is made of a light source that uses phosphor material. By adopting hybrid light sources in which solid-state light sources and a light source that uses a phosphor material are mixed, a lighting device can be realized that features both compact size and high luminance.

In addition, according to the lighting device of the present exemplary embodiment, the excitation light from excitation light sources 12 and 13 and the red laser light from red laser 10 are entered from the same direction to the side surface that is constituted by rectangular prism 20c of cross dichroic prism 20. Compared to a configuration in which the optical path of excitation light is provided separate from the optical path of red laser light, this configuration enables the realization of the above-described hybrid light sources with improved compactness that corresponds to the superposition of the optical path of excitation light on the optical path of red laser light.

In addition, the lighting device of the present exemplary embodiment can obtain the effects described hereinbelow.

The luminance of fluorescent light that is emitted from a phosphor material typically increases with the intensity of excitation light that is irradiated upon the phosphor material. According to the lighting device of the present exemplary embodiment, excitation light passes by way of collimator lens 15 and is condensed upon the phosphor region of phosphor wheel 14, and as a result, the intensity of the excitation light that irradiates the phosphor region can be increased by the condensing effect, and the luminance of the green fluorescent light that is emitted from the phosphor region can be increased. In addition, the fluorescent size in the phosphor region is determined according to the condensing size of the excitation light that irradiates the phosphor material. As a result, condensing and irradiating the light can decrease the fluorescent size.

Still further, the lighting device of the present exemplary embodiment can obtain the effects described hereinbelow.

Normally, when excitation light from two excitation light sources is condensed on one point on a phosphor region, the excitation light from one excitation light source is S-polarized light and the excitation light from the other excitation light source is P-polarized light, and after combining this excitation light by a polarization beam splitter, polarization conversion is carried so that the polarized component of the S-polarized light or P-polarized light is converted to the other polarization component. An element that carries out this type of polarization conversion incurs high cost and causes an increase in the device size.

In the lighting device of the present exemplary embodiment, in contrast, excitation light from excitation light source 12 is reflected by mirror 21 in the direction of cross dichroic prism 20, but the excitation light from excitation light source 19 passes through space around mirror 21. Excitation light that was reflected by mirror 21 and excitation light that passed through space around mirror 21 pass by way of dichroic mirror 22, first dichroic surface 1a, and collimator lens 15 and are condensed on the phosphor region of phosphor wheel 14. Phosphor wheel 14 is arranged at the combined focus position of collimator lens 15. As a result, by entering a plurality of excitation light to different positions of collimator lens 15, the plurality of excitation light can be condensed at the same place on the phosphor wheel. In other words, incidence of excitation light upon different positions of the collimator lens realizes combination of the excitation light.

The above-described configuration eliminates the need for a polarization conversion element, and a device of correspondingly lower cost and smaller size can therefore be achieved. In addition, collimator lens 15 for converting the green fluorescent light that is emitted from phosphor wheel 14 into parallel luminous flux can also serve as a condenser lens for condensing the excitation light from each of excitation light sources 12 and 19 on the phosphor region of phosphor wheel 14. In this way, a device can be realized in which the cost and size are further reduced.

The lighting device of the above-described present exemplary embodiment is an example of the present invention and the configuration of this device can be variously modified within a scope that does not depart from the gist of the present invention that will be clear to one of ordinary skill in the art.

For example, the number of excitation light sources is not limited to two, and one excitation light source or three or more excitation light sources may be used.

Figure 8:
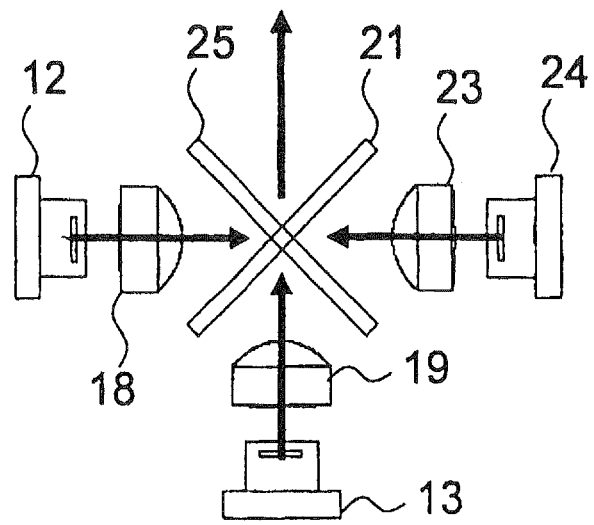
FIG. 8 is an upper view of the excitation light source portion of the lighting device that is equipped with three excitation light sources.
Figure 9:
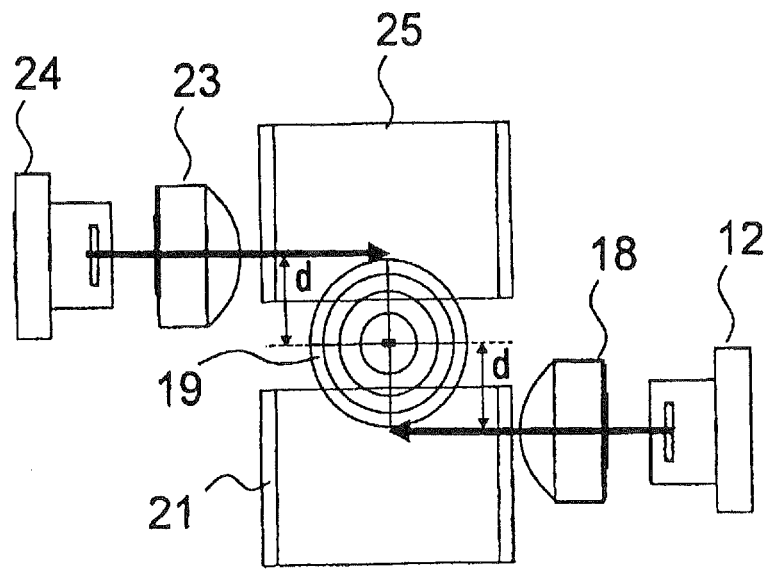
FIG. 9 is a side view of the excitation light source portion of the lighting device that is equipped with three excitation light sources.

FIG. 8 shows the upper surface of the excitation light source portion of a lighting device that is provided with three excitation light sources, and FIG. 9 shows the excitation light source portion as seen from the side (seen from the direction along the optical axis of excitation light source 13).

The excitation light source portion shown in FIG. 8 and FIG. 9 includes collimator lens 23, excitation light source 24, and minor 25 in addition to the configuration of the excitation light source portion composed of excitation light sources 12 and 13, collimator lenses 18 and 19, and mirror 21 shown in FIG. 1 and FIG. 2.

As shown in FIG. 8, when seen from above, mirror 25 is arranged so as to intersect with mirror 21 at approximately 90° in the portion at which the optical axes of each of excitation light sources 12, 13, and 24 intersect. As shown in FIG. 9, when seen from the side, minor 25 is arranged with a space so as not to overlap with mirror 21.

Collimator lens 23 converts excitation light (diverging light) that is supplied from excitation light source 24 to parallel luminous flux.

Excitation light that is supplied from excitation light source 12 and converted to parallel luminous flux by collimator lens 18 is irradiated into mirror 21. Excitation light that is supplied from excitation light source 24 and converted to parallel luminous flux by collimator lens 23 is irradiated into mirror 25. Excitation light that is supplied from excitation light source 13 and converted to parallel luminous flux by collimator lens 19 is transmitted through the space between mirror 21 and 25.

Similar to excitation light sources 12 and 13, the optical axis of excitation light source 24 and the optical axis of excitation light source 13 cross each other without intersecting in the same plane and while remaining separated by distance d (more preferably, a first plane that contains one optical axis and a second plane that contains the other optical axis are parallel, and the two optical axes cross at a right angle when viewed from a direction perpendicular to the first and second planes).

Excitation light from excitation light source 12 that is reflected by mirror 21, excitation light from excitation light source 24 that is reflected by mirror 25, and excitation light from excitation light source 13 that is transmitted through the space between minors 21 and 25 are each entered into dichroic mirror 22 shown in FIG. 1. In dichroic mirror 22, a first point at which the central beam of excitation light from mirror 21 is irradiated and a second point at which the central beam of excitation light from mirror 25 is irradiated are in a positional relation having point symmetry with a third point at which the central beam of excitation light from excitation light source 13 is irradiated as center.

Excitation light from excitation light sources 12, 13, and 24 that is transmitted by dichroic mirror 22 is reflected by first dichroic surface 1a shown in FIG. 1 and after further passing through collimator lens 15, is condensed on a point of the phosphor region of phosphor wheel 14.

According to the configuration that employs three excitation light sources as shown in FIGS. 8 and 9, excitation light of higher intensity can be obtained compared to a configuration that employs two excitation light sources, whereby the luminance of green fluorescent light can be further increased.

Constituting excitation light source portion from one excitation light source eliminates the need for excitation light source 12, collimator lens 18, and mirror 21 shown in, for example, FIG. 1. In this case, the optical axes of excitation light source 13 and red laser 10 may be arranged orthogonal to each other.

In the lighting device of the present exemplary embodiment, optics and light guide means may be provided for guiding light that is supplied from cross dichroic prism 20.

In addition, a phosphor unit that includes a region in which phosphor material is formed on the substrate surface may be used in place of phosphor wheel 14.

When phosphor material in which the fluorescent light color is green is excited, excitation light whose wavelength is shorter than green is used. The present exemplary embodiment is configured such that the optical path of excitation light is superposed on the optical path of red laser light, and the properties of the reflection surfaces of the cross dichroic prism are therefore designed to separate the red laser light and excitation light. The wavelength of red laser light is sufficiently separated from the wavelength of the excitation light, and designing the properties of such a reflection surface is therefore easy.

A configuration is also possible in which the optical path of the excitation light is superposed on the optical path of blue laser light. In this case, the properties of the reflection surface of the cross dichroic prism are designed to separate the blue laser light and excitation light. However, the wavelength of blue laser light is close to the wavelength of the excitation light, and a reflection surface that can reliably separate the blue laser light and the excitation light is therefore difficult to obtain.

A configuration is also possible in which the optical path of the excitation light is superposed over the optical path of blue laser light. In this case, regarding the wavelength of the excitation light, light having a still shorter wavelength than the wavelength of blue laser light such as ultraviolet light is used. First dichroic surface 1a has the property of reflecting the blue laser light, and moreover, transmitting the excitation light (ultraviolet light). Second dichroic surface 1b has the property of reflecting the wavelength of red laser light, transmitting blue laser light, and moreover, reflecting the excitation light (ultraviolet light). In other words, second dichroic surface 1b serves as a band-pass filter. A configuration in which the optical path of excitation light is superposed on the optical path of red laser light simplifies the reflection properties of the dichroic surface compared to a configuration in which the optical path of excitation light is superposed on the optical path of blue laser light.

Other Exemplary Embodiments

A lighting device according to another exemplary embodiment includes: an excitation light source unit that supplies excitation light; a phosphor unit that emits fluorescent light by excitation caused by excitation light that is supplied from the excitation light source unit; collimator lens that converts fluorescent light emitted from the phosphor unit to parallel luminous flux; a first solid-state light source that supplies first light whose peak wavelength is set in a first wavelength band that is longer than the wavelength of the fluorescent light emitted from the phosphor unit; a second solid-state light source that supplies second light whose peak wavelength is set in a second wavelength band that differs from the first wavelength band; a dichroic mirror that excitation light supplied from the excitation light source unit and light supplied from the first solid-state light source are combined and exited as a combined light; and color-combining means that is provided with first to fourth surfaces, wherein light that is combined by the dichroic mirror is supplied to the first surface, from the combined light that is supplied to the first surface, the excitation light is exited toward the phosphor unit from the second surface and the first light is exited from the fourth surface, the fluorescent light that is radiated from the phosphor unit is supplied to the second surface, the fluorescent light that is supplied to the second surface is exited from the fourth surface, the second light that is supplied from the second solid-state light source is supplied to the third surface, and the second light that is supplied to the third surface is exited from the fourth surface. The collimator lens condenses the excitation light that is exited from the second surface of the color-combining means on the phosphor unit.

The phosphor unit may be phosphor wheel 14 shown in FIG. 1. The first solid-state light source may be constituted from red laser 10 and collimator lens 16 shown in FIG. 1. The second solid-state light source may be constituted from blue laser 11 and collimator lens 17 shown in FIG. 1.

The excitation light source unit may be of a configuration that includes two excitation light sources as shown in FIG. 2, or may be of a configuration that includes three excitation light sources as shown in FIG. 8. The color-combining means may be cross dichroic prism 20 shown in FIG. 1. The dichroic mirror may be dichroic mirror 22 shown in FIG. 1.

The lighting device of this other exemplary embodiment exhibits action and effects similar to the lighting device of the above-described exemplary embodiment.

The lighting device of the present invention as described hereinabove can be generally applied to a projection-type display device of which a projector is representative.

A projection-type display device includes the lighting device of the present invention, a display element that spatially modulates light that is supplied from this lighting device, and projection optics that project image light formed in the display element. The display element is, for example, a DMD or liquid crystal panel.

Figure 10:
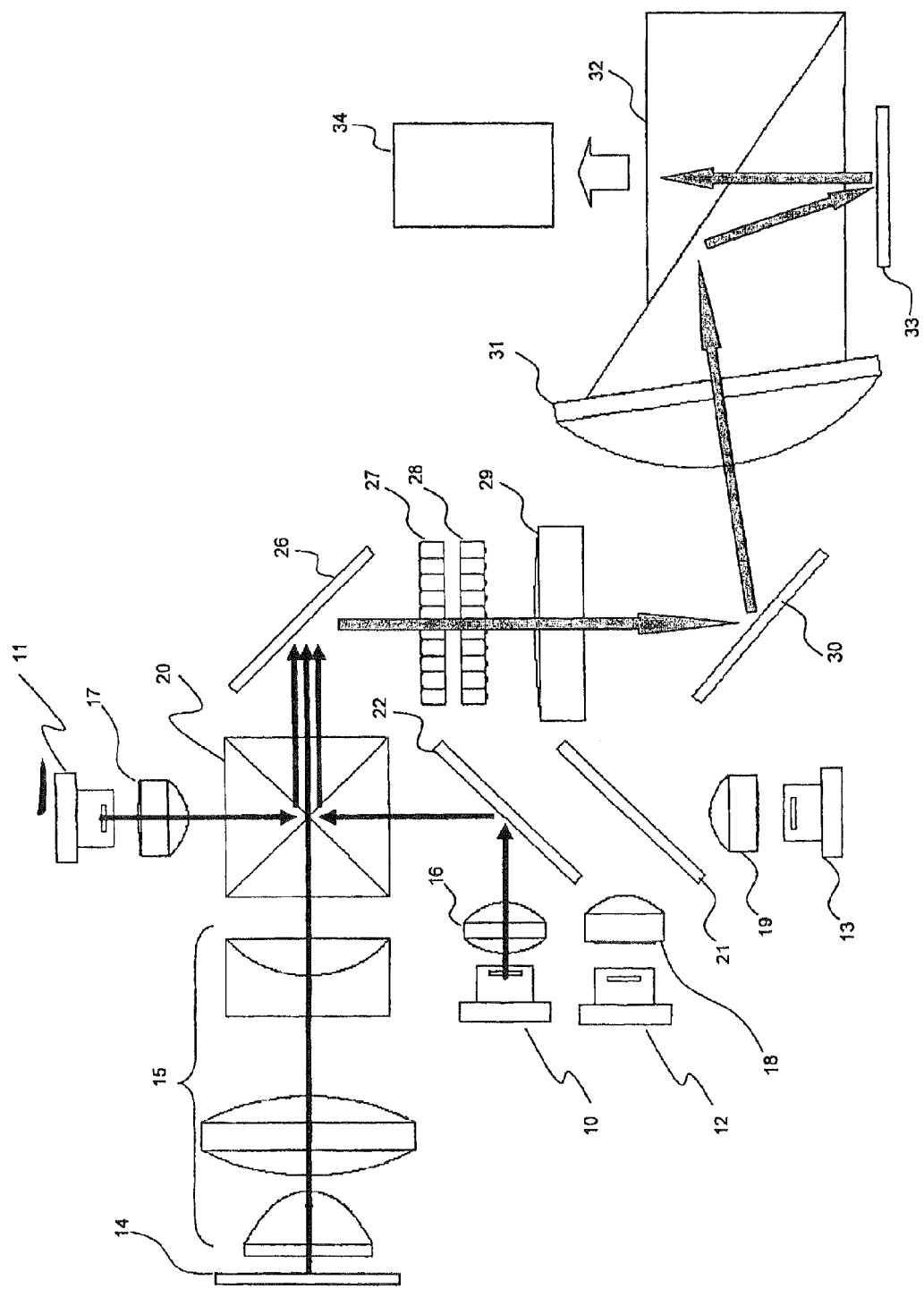
FIG. 10 is a schematic view showing an example of a projection-type display device that is provided with the lighting device of the present invention.

FIG. 10 shows an example of a projection-type display device that is equipped with the lighting device of the present invention. In FIG. 10 for the sake of convenience, the optical paths of excitation light have been omitted.

Referring to FIG. 10, the projection-type display device includes: DMD 33 that is a display element, the lighting device shown in FIG. 1, optics for guiding light from this lighting device to DMD 33, and projection optics 34 that project the image light formed in DMD 33 onto a screen (not shown).

The optics include mirrors 26 and 30, fly-eye lenses 27 and 28, field lens 29, condenser lens 31, and total internal reflection (TIR) prism 32.

Mirror 26 is arranged in the direction of advance of light (red, green, and blue) that is exited from the emission surface (the surface of rectangular prism 20d) of cross dichroic prism 20, and reflects light from this emission surface. Fly-eye lenses 27 and 28, field lens 29, and mirror 30 are arranged in that order in the direction of advance of light that is reflected by mirror 26.

Fly-eye lenses 27 and 28 are elements for obtaining rectangular illumination and uniform illumination light on the illuminated surface of DMD 33, are each composed of a plurality of micro-lenses, and are arranged such that the micro-lenses have mutual one-to-one correspondence.

Light that is transmitted by fly-eye lenses 27 and 28 is entered by way of field lens 29, mirror 30, and condenser lens 31 to TIR prism 32. TIR prism 31 is configured from two triangular prisms, and the light that was condensed by condenser lens 31 is entered into TIR prism 32 from the side surface of one of the triangular prisms. In TIR prism 32, the incident light undergoes total reflection at the oblique surface of the triangular prism, and this reflected light is exited toward DMD 33 from the other surface of the one triangular prism. The surface at which the two triangular prisms are bonded is a total reflection surface and an air layer is necessary between the two surfaces. Accordingly, when bonding the two triangular prisms together, an air layer is maintained between the two triangular prisms by adhering, for example, spacers interposed between the two triangular prisms.

DMD 33 spatially modulates light that supplied from TIR prism 32. The modulated light (image light) from DMD 33 is again entered to TIR prism from the other surface of the one triangular prism, and the entered image light then passes through the bonded surface of the triangular prisms without alteration and is exited from the side surface of the other triangular prism.

The image light that is exited from the side surface of the other triangular prism of TIR prism 32 is magnified and projected onto an external screen by projection optics 34.

By controlling the timing of lighting up excitation light sources 12 and 13, red laser 10, and blue laser 11, luminous flux of each of the colors of red, green, and blue is exited in time divisions from the side surface (emission surface) that is constituted by rectangular prism 20d of cross dichroic prism 20. Using DMD 33 to spatially modulate the luminous flux of each color that is exited in these time divisions enables image light of each color to be obtained.

What is claimed is:

1. A lighting device, comprising:
   an excitation light source unit that supplies excitation light;
   a phosphor unit that emits fluorescent light by excitation caused by excitation light supplied from said excitation light source unit;
   a collimator lens that converts fluorescent light emitted from said phosphor unit to parallel luminous flux;
   a first solid-state light source that supplies first light whose peak wavelength is set in a first wavelength band in which wavelength is longer than the wavelength of fluorescent light emitted from said phosphor unit;
   a second solid-state light source that supplies second light whose peak wavelength is set in a second wavelength band that is set in a range of bands other than said first wavelength band;
   a dichroic mirror in which excitation light supplied from said excitation light source unit and light supplied from said first solid-state light source are combined and exited as a combined light; and
   a color-combining unit that is provided with first to fourth surfaces, light that is combined by said dichroic mirror being supplied to said first surface, and from said combined light supplied to said first surface, said excitation light being exited toward said phosphor unit from said second surface, said first light being exited from said fourth surface, said fluorescent light emitted from said phosphor unit being supplied to said second surface, said fluorescent light that was supplied to said second surface being exited from said fourth surface, said second light that was supplied from said second solid-state light source being supplied to said third surface, and said second light that was supplied to said third surface being exited from said fourth surface;
   wherein said collimator lens condenses said excitation light that was exited from said second surface of said color-combining unit on said phosphor unit.

2. The lighting device according to claim 1, wherein said excitation light source unit comprises:
   first and second excitation light sources that are provided such that the optical axes of each excitation light source cross each other in a state of being separated by a predetermined distance, each of said first and second excitation light sources supplying excitation light having a first polarization; and
   a first mirror that is provided at a position at which the optical axes of each of said first and second excitation light sources cross and that reflects the excitation light of said first polarization that is supplied from said first excitation light source toward said dichroic mirror;
   wherein the excitation light of said first polarization supplied from said second excitation light source passes through space around said first mirror and is entered to said dichroic mirror.

3. The lighting device according to claim 2, wherein said excitation light source unit further comprises:
   a third excitation light source that is provided such that its optical axis crosses the optical axis of said second excitation light source in a state of being separated by a predetermined distance and that supplies excitation light having said first polarization; and
   a second mirror that is provided at a position at which the optical axis of each of said second and third excitation light sources cross and that reflects the excitation light of said first polarization that is supplied from said third excitation light source toward said dichroic mirror;
   wherein:
   said first and second mirrors are provided such that a first plane that contains a film surface of one mirror and a second plane that contains a film surface of the other mirror are orthogonal and said first and second mirrors are arranged separated by a predetermined spacing when seen from a direction perpendicular to one of said first and second planes; and
   the excitation light of said first polarization that is supplied from said second excitation light source passes through the space between said first and second mirrors.

4. The lighting device according to claim 2, wherein:
   said phosphor unit emits green fluorescent light;

said first solid-state light source supplies light having said first polarization whose peak wavelength is set in a red wavelength band;

said second solid-state light source supplies light having said first polarization whose peak wavelength is set in a blue wavelength band;

said excitation light source unit supplies excitation light whose peak wavelength is set in the blue wavelength band;

said color-combining unit includes first and second films that are provided such that film surfaces are mutually orthogonal;

a cutoff wavelength of said first film with respect to said first polarization is set such that light of said green and red wavelength bands is transmitted and light of said blue wavelength band is reflected;

a cutoff wavelength of said second film with respect to said first polarization is set such that light of said green and blue wavelength bands is transmitted and light of said red wavelength band is reflected; and in said color-combining unit, said first light that is entered from said first surface, said fluorescent light that is entered from said second surface, and said second light that is entered from said third surface are combined by means of said first and second films and exited as a combined light from said fourth surface, and said excitation light that is entered from said first surface is reflected toward said phosphor unit by means of said first film.

5. A projection-type display device comprising:
the lighting device according to claim 1;
a display element that spatially modulates light that is exited from said lighting device; and
projection optics that project image light that is formed by said display element.

6. The lighting device according to claim 3, wherein:
said phosphor unit emits green fluorescent light;
said first solid-state light source supplies light having said first polarization whose peak wavelength is set in a red wavelength band;
said second solid-state light source supplies light having said first polarization whose peak wavelength is set in a blue wavelength band;
said excitation light source unit supplies excitation light whose peak wavelength is set in the blue wavelength band;
said color-combining unit includes first and second films that are provided such that film surfaces are mutually orthogonal;
a cutoff wavelength of said first film with respect to said first polarization is set such that light of said green and red wavelength bands is transmitted and light of said blue wavelength band is reflected;
a cutoff wavelength of said second film with respect to said first polarization is set such that light of said green and blue wavelength bands is transmitted and light of said red wavelength band is reflected; and
in said color-combining unit, said first light that is entered from said first surface, said fluorescent light that is entered from said second surface, and said second light that is entered from said third surface are combined by means of said first and second films and exited as a combined light from said fourth surface, and said excitation light that is entered from said first surface is reflected toward said phosphor unit by means of said first film.

7. A projection-type display device comprising:
the lighting device according to claim 2;
a display element that spatially modulates light that is exited from said lighting device; and
projection optics that project image light that is formed by said display element.

8. A projection-type display device comprising:
the lighting device according to claim 3;
a display element that spatially modulates light that is exited from said lighting device; and
projection optics that project image light that is formed by said display element.

9. A projection-type display device comprising:
the lighting device according to claim 4;
a display element that spatially modulates light that is exited from said lighting device; and
projection optics that project image light that is formed by said display element.

* * * * *